R. REINKE.
LEVER LOCKING DEVICE.
APPLICATION FILED AUG. 16, 1912.
1,102,802.
Patented July 7, 1914.
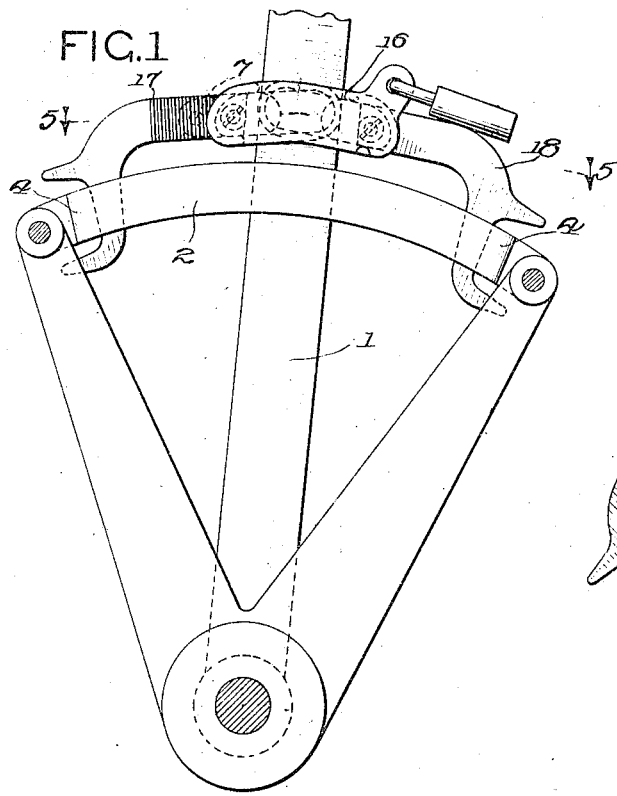
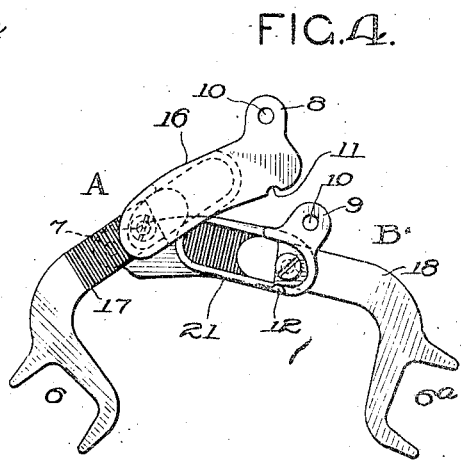
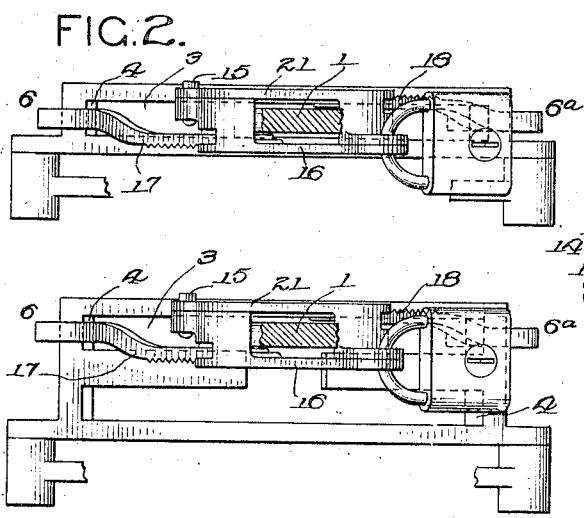
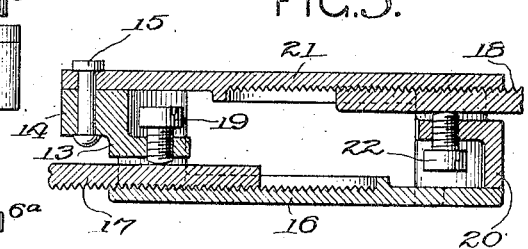
Witnesses:
J. C. Derick.
Lincol B. Smith.
Inventor:
Robert Reinke
By Luther L. Miller
Atty.

UNITED STATES PATENT OFFICE.

ROBERT REINKE, OF CHICAGO, ILLINOIS.

LEVER-LOCKING DEVICE.

1,102,802.  Specification of Letters Patent.  Patented July 7, 1914.

Application filed August 16, 1912. Serial No. 715,328.

*To all whom it may concern:*

Be it known that I, ROBERT REINKE, a citizen of the United States, residing at Chicago, in the county of Cook and the State of Illinois, have invented certain new and useful Improvements in Lever-Locking Devices, of which the following is a specification.

My invention relates to means for locking levers; it is more particularly designed to provide a simple, convenient and efficient device to securely lock the transmission control lever of an automobile in the neutral or inoperative position so that the automobile cannot be operated by unauthorized persons.

A further object of my invention is to provide a device adjustable in dimension, which can be used with various makes of automobiles; and a further object is to provide an effective locking device which may be easily and quickly applied and which will not require attachment to the car or the changing of any part of the car.

In the accompanying drawings, Figure 1 is a side elevation of the arcuate lever guide frame of an automobile with its supports, showing a portion of the control lever locked in position with my improved locking device. Fig. 2 is a top view, partly sectional, showing the lever locked in position in a single slot guide frame. Fig. 3 is a similar top view showing the locking device applied to a guide frame of the H-slot type common on automobiles. Fig. 4 is a side elevation of the locking device in a partly open position. Fig. 5 is a fragmentary top view of a section on the line 5—5 of Fig. 1.

In the embodiment of my invention which I have selected for illustration the locking device is adapted for application to an automobile control lever 1, extending through an arcuate guide 2, which is fixed to the car and which limits the movement of the lever.

3 is the slot in the guide through which the lever 1 extends; this slot has substantially vertical end walls 4.

That form of my invention herein shown comprises two compound members A and B, adapted when in position to extend from end to end of the guide slot 3 and having forks 6 and 6ª to engage the end walls thereof. One end of the member B is pivotally connected with the member A at 7. Lugs 8 and 9 on the members A and B, respectively, contain apertures 10 which, when the device is in a closed or operative position, are brought into register with each other and through them the bow of a padlock is inserted; and a notch 11, in the member A, engages a stud 12 in the member B and aids in securing rigidity and strength in the device.

The method of constructing the members A and B which I prefer is illustrated in the drawings and may be described as follows: The block 13 carries at one end a lug 14, through which passes the pivot bolt 15; from the opposite end of the block 13 an arm 16 projects at right angles, bearing at its end the lug 8 hereinbefore referred to. A portion of the arm 16 is offset and its inner side is serrated to engage a similarly serrated side of the arm 17; the arms 16 and 17 are held in engagement by means of a setscrew 19. The block 20 carries an arm 21, offset and serrated like the arm 16, and having its end perforated for the reception of the pivot bolt 15; the block 20 carries also the lug 9, before referred to, and a setscrew 22, adapted to hold in engagement the serrated sides of the arms 18 and 21, as shown in Fig. 5. There is a double curve in each of the arms 17 and 18 for the purpose of bringing their ends into alinement.

In use, when it is desired to lock the lever 1 in place, the device is folded slightly on the pivot 15 and is applied to the lever 1 a little distance above the guide slot; it is then moved downward, the arms 17 and 18 depending somewhat, until the lower prongs of the forks 6 and 6ª have cleared the end walls of the guide slot, when the members A and B are pressed into alinement and the bow of a padlock inserted through the two apertures 10. The forked ends of the arms 17 and 18 will then lie adjacent to the end walls of the guide slot 3, the prongs serving to prevent the removal of locking device from the guide slot; and the lever 1 will be held between the blocks 13 and 20 in a position midway of the guide slot.

By means of the setscrews 19 and 22 the members A and B can be lengthened or shortened to adapt the device for use in slots of varying length. These setscrews can only be reached when the device is in an open position.

My invention is not limited to the specific details here shown, as various changes may be made in the specific embodiment without departing from the spirit or scope of the invention.

I claim as my invention:

1. In a lever locking device a single slotted lever guide; a lever movable therein; two pivotally connected members adapted to embrace the said lever and having forked ends adapted to bear internally against the ends of said guide; and means to lock the said members in a closed position.

2. In a lever locking device, a single slotted lever guide; a lever movable therein; two pivotally connected extensible members adapted to embrace the said lever and having forked ends adapted to bear internally against the ends of said guide; and means for locking the said members in a closed position.

3. In a device of the class described, in combination, a lever; a guide frame having a slot in which said lever moves; two pivotally connected extensible members having forked ends adapted to bear against the end walls of the said guide frame at opposite ends of the said slot, said members being adapted to embrace the said lever and hold it in a position midway of the said slot; and means for locking said members in position.

4. In a device of the class described, a slotted lever guide; a lever movable therein; a pivoted frame adapted to be clasped about said lever; means for locking said frame in a closed position; two forked arms extensibly connected with said frame and adapted to bear against opposite ends of said lever guide; means for extending said arms, said means being so disposed as to be inaccessible while the said frame is locked in a closed position.

5. In a device of the class described, a lever; a guide frame having a slot in which said lever moves; two pivotally connected extensible members having forked ends adapted to bear against the opposite end walls of said slot; blocks forming with said members a frame adapted to embrace the said lever; lugs on said members having apertures which register when the said frame is in a closed position; and means for locking said lugs together.

6. In a device of the class described, a lever; a guide frame having a slot in which said lever moves; two pivotally connected extensible members having forked ends adapted to bear against the opposite end walls of said slot; blocks forming with said members a frame adapted to embrace the said lever; lugs on said members having apertures which register when the said frame is in a closed position; and a padlock having a bow adapted to be inserted through said apertures and locked therein.

7. In a device of the class described, a lever guide; a lever movable therein; pivotally connected extensible members for embracing the said lever and holding it against movement in any direction; and means for locking said members against relative movement.

8. In a device of the class described, a lever, a guide frame having a slot in which said lever moves, members adapted to engage the opposite end walls of said slot and lock said lever against movement, and means for extending or shortening said members, said means including a set screw so arranged as to be inaccessible for manipulation when the lever is locked in position.

9. In a device of the class described, in combination, a slotted lever guide; a lever movable therein; a pivoted frame adapted to be clasped about said lever; means for locking said frame in a closed position; arms extensibly connected with said frame and adapted to bear against the ends of said lever guide; and set screws adapted to lock said extensible arms to said frame and so disposed as to be inaccessible for manipulation when said frame is locked in a closed position.

In testimony whereof I affix my signature in the presence of two witnesses.

ROBERT REINKE.

Witnesses:
JOSEPH DOUGHERTY,
CHAS. J. McHUGH.

---

Copies of this patent may be obtained for five cents each, by addressing the "Commissioner of Patents, Washington, D. C."